(No Model.)
A. M. BRUNSWICK & G. E. JOHNSON.
YIELDING AND SELF ADJUSTING SUPPORT FOR TROLLEY WHEELS.
No. 564,955.　　　　　　　　　　Patented July 28, 1896.
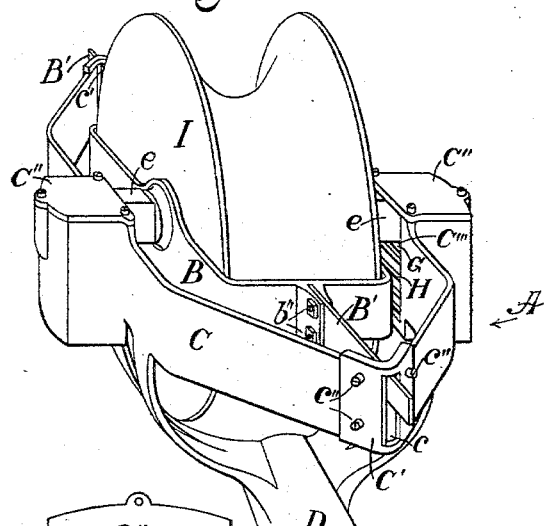
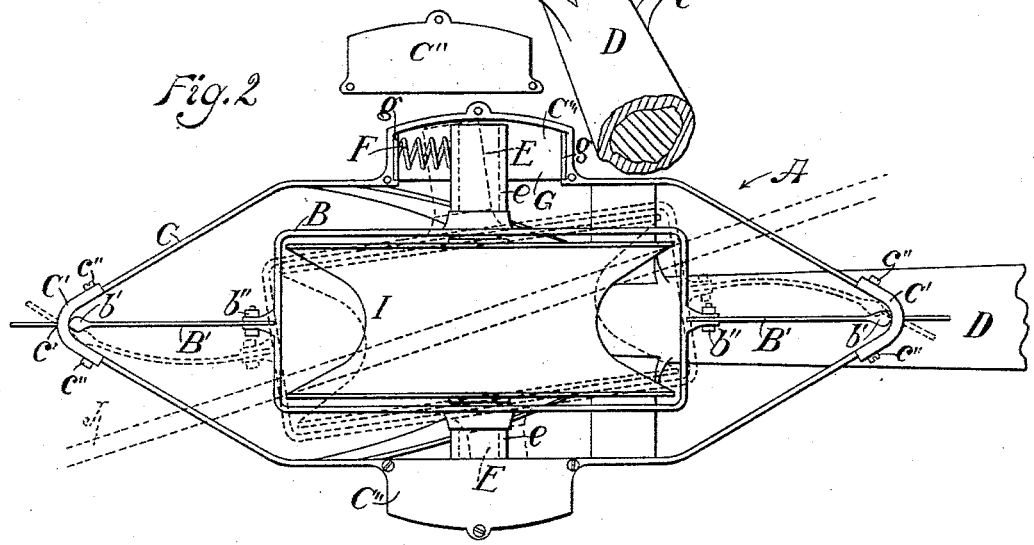
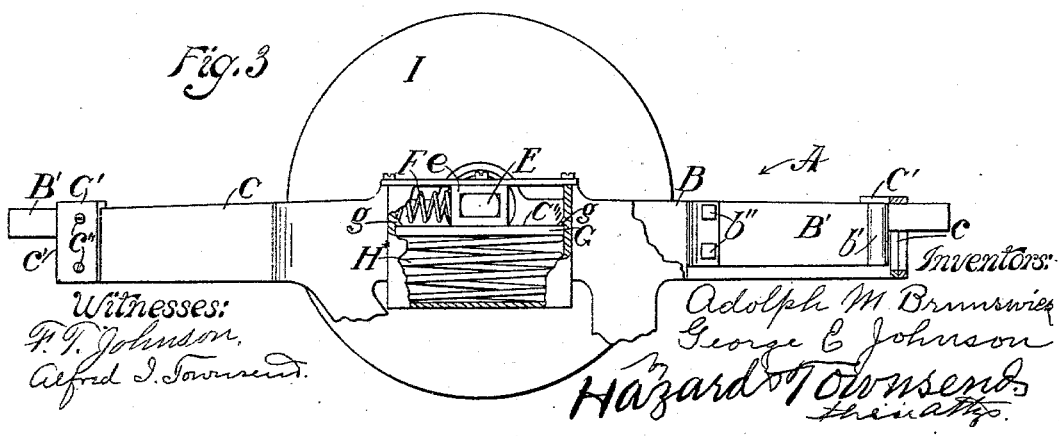
Witnesses:
F. T. Johnson.
Alfred I. Townsend.
Inventors:
Adolph M. Brunswick
George E. Johnson
Hazard Townsend
their Attys.
THE NORRIS PETERS CO., PHOTO-LITHO., WASHINGTON, D. C.

UNITED STATES PATENT OFFICE.

ADOLPH M. BRUNSWICK AND GEORGE E. JOHNSON, OF LOS ANGELES, CALIFORNIA.

YIELDING AND SELF-ADJUSTING SUPPORT FOR TROLLEY-WHEELS.

SPECIFICATION forming part of Letters Patent No. 564,955, dated July 28, 1896.

Application filed October 7, 1895. Serial No. 564,891. (No model.)

*To all whom it may concern:*

Be it known that we, ADOLPH M. BRUNSWICK and GEORGE E. JOHNSON, citizens of the United States, residing at Los Angeles, in the county of Los Angeles and State of California, have invented a new and useful Yielding and Self-Adjusting Support for Trolley-Wheels and Analogous Devices, of which the following is a specification.

With the devices now in common use great trouble is experienced with trolleys on account of the tendency of the trolley-wheel to run from the trolley-wire, especially in turning curves; also the side strain thus placed upon the trolley-axle causes the axle to become rapidly worn. The cause of these objectionable features is that the flanges of the wheel ride upon the wire to such an extent as to cause the wire to climb the flanges, which causes the side strain upon the wheel, which wears the axle and causes the wheel to jump from the wire. When this occurs, the trolley-pole is oftentimes broken by its forcible contact with the supports which hold the trolley-wire in position. Furthermore, at the point where the supporting-wires are attached to the trolley-wires there is oftentimes a sufficient bump of solder to make an inequality in the trolley-wire, which causes the trolley, when in rapid motion, to jump the wire when it comes in contact with such inequality.

Another cause of much trouble arises from the fact that the springs which force the trolley-pole upward to hold the trolley in position upon the trolley-wire are necessarily very strong, and when the trolley-wheel crosses a switch the trolley in traveling over the unequal surface of the frog is subjected to a succession of severe blows, which are augmented by the momentum of the heavy trolley-pole. In all devices heretofore in common use the trolley has been unyieldingly secured to its support and the support rigidly secured to the trolley-pole, and the effect of the severe strain to which the trolley is subjected by crossing the switches is so great that it is a common occurrence for the axles of the trolley to be broken thereby.

Our invention relates particularly to that class of devices designed to overcome these objections.

One object of our invention is to produce an exceedingly cheap and simple trolley-support of this class which will allow the wheel to readily adjust itself to the wire in turning curves, thus to prevent the wheel from jumping from the trolley-wire, and also to prevent unnecessary wear of the axle.

A further object is to provide a support for a trolley which will firmly hold the trolley in position upon the trolley-wire, but will yieldingly connect the trolley with the trolley-pole, so that the momentum of the trolley-pole will be absorbed by such connection sufficiently to prevent any injury to the axle or to the trolley when the trolley is crossing any portion of the trolley-line which may have an unequal surface.

The accompanying drawings illustrate our invention.

Figure 1 is a perspective front view of a trolley embodying our invention. Fig. 2 is a plan view of the same. One of the caps which close the axle-seats is removed to show the arrangement of parts. In this view the position of the trolley-wheel and the inner frame with relation to the outer frame when the trolley is passing around a curve is indicated in dotted lines. Fig. 3 is a side elevation of our device, parts being broken away to expose the construction and to contract the view.

In the drawings, A represents the trolley-support, which is formed of an inner frame B and an outer frame C. These frames are connected with each other in such manner that the inner frame can move with relation to the outer frame. The manner in which we accomplish this is as follows: The outer frame C is attached to the trolley-pole D in the ordinary manner of trolley-supports, and is provided at each end with a vertical slot $c\ c'$. To each end of the frame B is secured a flat spring B', the outer end of each spring passing through one of the slots $c'$, thus to normally hold the inner frame B and the trolley-wheel I parallel with the outer frame. These springs B' are flat and are each provided with a bead or shoulder $b'$, which, when the two frames are in their normal position with relation to each other, bear against the inner face of each apex of the outer frame, thus to hold the inner frame from shifting fore and aft with relation to the outer frame.

The springs B' are secured to the inner frame by bolts or rivets b'', and in order to allow the inner frame to be readily placed in position in the outer frame one of the slots, c, in the outer frame is open at the top, so that one of the springs B' can be slipped from the inside of the outer frame through the slot c', and the other spring will then readily slip into the other slot c, after which the slotted cap C' is slipped upon the projecting end of the spring and is fastened to the frame C by screws c''.

The trolley-axle E is angular at each end, and is passed through corresponding openings provided in the inner frame, so that the inner frame is thus rigidly secured to the axle. The trolley-wheel I is journaled upon the axle inside the inner frame. The outer ends of the axle extend outward beyond the sides of the inner frame and are arranged to slide back and forth in the elongated axle-seats C''', which are provided in the outer frame. C'' are removable caps arranged to close the axle-seats C'''. In order to give a greater bearing-surface for the sliding ends of the axle, a cap e is fitted upon each end of the axle, and each cap seats in one of the axle-seats C'''.

Behind each end of the axle and interposed between the end of the axle and the rear end of its respective seat is a spring F, so arranged that when the trolley is passing around a curve and the axle is thus shifted or twisted to cause the inner frame to partially rotate in a horizontal plane with relation to the outer frame, as indicated in dotted lines in Fig. 2, that the spring which is at that end of the axle which is thrown toward the rear by the shifting of the wheel will gently support the axle and prevent the inner frame from sliding to the rear when the fore and aft support afforded to the inner frame by the flat springs B' is withdrawn therefrom by reason of the springs being bent by the shifting of the inner frame, as indicated in dotted lines in Fig. 2, which withdraws the beads b' from their engagement with the inner face of the apex of the outer frame.

In order to form a yielding support for the trolley when crossing the frogs of switches, or any other inequalities in the trolley-line, we form the bottom of each axle-seat C'''' of a movable plate G, and beneath such plate we arrange a spiral spring H to normally force the plate upward against the shoulders g, which are provided to limit the upward motion of the plate. The springs H are secured to the outer frame of the support, and the springs F, which resist the backward pressure of the axle, are secured to the bearing-blocks e, which are slipped upon the ends of the axle.

The mode of fastening the springs in place is not of our invention, and illustration and description thereof are not necessary herein.

In practice the trolley-support and trolley are secured to the trolley-pole in the usual manner, and as the trolley passes along on the wire when it strikes any unequal place on the wire the springs H give sufficiently to prevent any excessive strain being brought to bear upon the axle or on the trolley.

When the axle is in its normal position, as shown in Fig. 3, the springs B' each engage the top of its respective slot c c', and such springs thus prevent the inner frame from tilting horizontally with relation to the outer frame.

In going around a curve, when the trolley-wire J is brought into contact with the base of the flanges of the wheel, as indicated in dotted lines in Fig. 2, the trolley-wheel and the inner frame move in response to such pressure, the springs B' at the end of the frame B and the springs F at the rear of the axle giving sufficiently to allow the trolley to follow the curve of the trolley-wire without any tendency to jump the wire.

We are aware that it has been proposed by making the trolley-axle in two parts, each part being held in place by a ball-and-socket joint, to allow the trolley-wheel a slight twisting movement with relation to its support. Our invention is to be distinguished from such construction in that our axle is integral, giving that strength which is essential to enable the axle to withstand the severe strain which is placed upon it.

Now, having described our invention, what we claim as new, and desire to secure by Letters Patent, is—

1. A trolley comprising an inner and an outer frame, a trolley-wheel journaled in the inner frame, and suitable means connecting the inner and the outer frames and arranged to allow the inner frame to partially rotate with relation to the outer frame.

2. A trolley comprising an inner and an outer frame, a trolley-wheel journaled in the inner frame, and suitable means connecting the inner and the outer frames and arranged to allow the inner frame to partially rotate in a horizontal plane, and to also move up and down with relation to the outer frame.

3. In a trolley, the combination of the inner frame; the outer frame; the trolley-wheel having its axle secured to the inner frame and having its ends movably secured in the outer frame; and suitable yielding connections arranged to connect the inner frame with the outer frame.

4. In a trolley, the combination of the inner frame; the outer frame; the trolley-wheel having its axle secured to the inner frame and having its ends arranged to slide in the outer frame; and the springs arranged connecting the inner frame with the outer frame.

5. In a trolley, the combination of the inner frame; the outer frame provided with the elongated axle-seats; the trolley-wheel having its axle passed through the inner frame and its ends arranged in the axle-seats of the outer frame; springs, one interposed between each end of the axle and the rear end of its respective seat, and suitable yielding connections arranged connecting the inner frame with the outer frame.

6. In a trolley, the combination of the inner frame; the outer frame provided at its ends with the vertical slots and also provided with the longitudinal elongated axle-seats; the springs, one secured to each end of the inner frame and each having its end passed through one of the slots in each end of the outer frame; the trolley-wheel having its axle secured to the inner frame and having its ends arranged in the axle-seats, and the springs interposed between each end of the axle and the rear end of its respective seat.

7. In a trolley, the combination of the inner frame; the outer frame provided at its ends with the vertical slots, and also provided with the longitudinal elongated axle-seats; the flat springs, one secured to each end of the inner frame and each having its end passed through one of the slots provided in the outer frame, and provided with the bead or shoulder arranged to engage the inner face of the apex of the outer frame when the two frames are in their normal position with relation to each other; the trolley-wheel having its axle secured to the inner frame and having its ends arranged in the axle-seats, and the springs interposed between each end of the axle and the rear end of its respective seat.

A. M. BRUNSWICK.
GEO. E. JOHNSON.

Witnesses:
ALFRED I. TOWNSEND,
JAMES R. TOWNSEND.